US005552519A

United States Patent [19]
Hemmings et al.

[11] Patent Number: 5,552,519

[45] Date of Patent: Sep. 3, 1996

[54] ROSIN ESTER DERIVATIVE AS SURFACTANTS

[75] Inventors: Paul N. Hemmings, Bristol, England; Long Wang, Taipei, Taiwan

[73] Assignee: EKA Nobel, AB, Sweden

[21] Appl. No.: 436,187

[22] PCT Filed: Nov. 15, 1993

[86] PCT No.: PCT/SE93/00970

§ 371 Date: May 16, 1995

§ 102(e) Date: May 16, 1995

[87] PCT Pub. No.: WO94/12272

PCT Pub. Date: Jun. 9, 1994

[30] Foreign Application Priority Data

Nov. 20, 1992 [SE] Sweden .................................. 9203499

[51] Int. Cl.⁶ .......................... B01F 17/34; B01F 17/52; C08L 93/04; C09J 9/00

[52] U.S. Cl. .......................... 530/216; 530/210; 530/215; 530/218; 156/327; 156/332; 526/911; 526/931; 526/932

[58] Field of Search .................................. 530/210, 215, 530/216, 218; 156/327, 332; 525/54.4, 54.5; 526/911, 931, 932

[56] References Cited

U.S. PATENT DOCUMENTS

| | | | |
|---|---|---|---|
| 2,647,888 | 8/1953 | Floyd | 530/218 |
| 4,260,550 | 4/1981 | Armstrong et al. | 560/6 |
| 4,297,270 | 10/1981 | Uhrig et al. | 530/216 |
| 4,477,613 | 10/1984 | Evans et al. | 524/77 |
| 4,758,379 | 7/1988 | Johnson, Jr. | 530/218 |
| 4,919,725 | 4/1990 | Jones | 106/218 |
| 5,130,375 | 7/1992 | Bernard et al. | 525/278 |
| 5,225,527 | 7/1993 | Fallmann et al. | 530/218 |
| 5,268,408 | 12/1993 | Catena et al. | 524/389 |

FOREIGN PATENT DOCUMENTS

| | | |
|---|---|---|
| 0296729 | 12/1988 | European Pat. Off. |
| 59-80467 | 5/1984 | Japan . |
| 2155942 | 10/1985 | United Kingdom . |

OTHER PUBLICATIONS

Chemical Abstract 108: 9669x 1987.

*Primary Examiner*—Nathan M. Nutter
*Attorney, Agent, or Firm*—Ralph J. Mancini; Louis A. Morris

[57] ABSTRACT

Surfactant obtainable by and method for the production thereof comprising (1) esterifying a rosin with an alcohol to an acid value of less than 30, (2a) grafting the rosin ester with an unsaturated carboxylic acid or anhydride, the mole ratio carboxylic acid or anhydride/rosin (calculated as each rosin associated with a rosin ester) being from 0.05:1–1.5:1, (3a) esterifying the grafted rosin ester with a polyethylene glycol with an Mw of 1000–20000 the mole ratio glycol/free carboxylic acid group being from 0.2:1–1:1 to an acid value of less than 30, alternatively (2b) esterifying an unsaturated carboxylic acid or anhydride with a polyethylene glycol with a Mw of 1000–20000 the mole ratio glycol/free carboxylic acid group or anhydride being from 0.2:1–1:1 to an acid value less than 30, (3b) grafting the rosin ester from (1) with the ester from (2b), the mole ratio ester from (2b)/rosin ester (calculated as in (2a)) being from 0.05:1–1.5:1. The invention also relates to the use of the surfactant as a dispersing agent for tackifiers, to an aqueous tackifier dispersion comprising the surfactant as well as to the use of the aqueous tackifier dispersion in a pressure sensitive adhesive.

14 Claims, No Drawings

1

ROSIN ESTER DERIVATIVE AS SURFACTANTS

The present invention relates to a new surfactant, to a process for the production thereof and to the use of the surfactant as a dispersing agent for tackifiers. The invention also relates to aqueous tackifier dispersions including the new surfactant and to the use of the aqueous tackifier dispersions in pressure sensitive adhesives.

Pressure sensitive adhesives based on e.g. aqueous acrylic and carboxylated styrene butadiene polymers are usually formulated to include a tackifier. The tackifier facilitates the coating process for the adhesive and improves the adhesive properties such as tackiness, peel-resistance and ease of surface wetting. The tack of an adhesive enables it to form an immediate bond between contacted surfaces when they are brought together.

Tackifier resins consist mainly of rosin and derivatives thereof or hydrocarbon resins. In aqueous based adhesives it is common to include the tackifier resin in the form of an aqueous dispersion. The aqueous dispersion is made by first melting the rosin or resin and then adding a surfactant and water to form a dispersion in which the rosin/resin is the dispersed phase and water the continuous phase. A to of different surfactants are known. As typical surfactants there can be mentioned alkyl sulphonates, fatty alcohol sulphates, phosphate esters. GB 2 155 942 relates to a surfactant comprising a salt of a sulphosuccinate half ester of an alkoxylated, fortified rosin. The drawback with known tackifier dispersions is that they reduce the cohesive strength (internal strength) of the adhesive dramatically. This is due to a combined effect of the lower molecular weight of the tackifier, compared with polymer resin, and the kind of surfactant used in the tackifier dispersion.

It is accordingly an object of the present invention to obtain a surfactant for the preparation of tackifier dispersion with reduced loss in cohesive strength when formulated compared to known tackifier dispersions. It is further an object of the present invention to obtain a tackifier dispersion which is stable at room temperature and which has a good mechanical stability and low foaming characteristics.

The objects of the invention are achieved by a surfactant as claimed in the claims. The surfactant is obtainable by (1) esterifying a rosin with an alcohol to an acid value of less than 30, (2a) grafting the rosin ester with an unsaturated carboxylic acid or anhydride, the mole ratio carboxylic acid or anhydride/rosin (calculated as each rosin associated with a rosin ester) being from 0.05:1–1.5:1, (3a) esterifying the grafted rosin ester with a polyethylene glycol with a Mw of 1000–20000, the mole ratio glycol/free carboxylic acid group being from 0.2:1–1:1 to an acid value of less than 30, alternatively (2b) esterifying an unsaturated carboxylic acid or anhydride with a polyethylene glycol with a Mw of 1000–20000, the mole ratio glycol/free carboxylic acid group or anhydride being from 0.2:1–1:1 to an acid value less than 30, (3b) grafting the rosin ester from (1) with the ester from (2b), the mole ratio ester from (2b)/rosin ester (calculated as in (2a)) being from 0.05:1–1.5:1.

Similar surfactants are known from U.S. Pat. No. 4,260,550 but for quite different purposes. These surfactants are used in cream and lotion and hair care formulations.

It was surprisingly found that with the new surfactants according to the invention stable tackifier dispersions could be prepared which resulted in adhesives with improved cohesive strength compared with known tackifier systems but without detrimentally affecting the adhesive performance. With some polymer binders the tackifier dispersion according to the invention even maintains the same cohesive strength as with the neat polymer.

The surfactant according to the invention is prepared from a rosin. Rosin is a natural product consisting of mixed unsaturated acids. The rosin acids are mainly monobasic carboxylic acids containing the phenanthrene skeleton with 20 carbon atoms in the molecule. The difference between the acids is the number and position of the double bonds. Natural rosin may be classified due to its origin namely as gum rosin, wood rosin or tall oil rosin. The surfactant according to the invention can be prepared from any of these rosins or from mixtures thereof.

It is also possible to start with a disproportionated rosin. Disproportionation is a method of stabilizing the rosin. It involves transferring hydrogen atoms from one molecule of abietic acid to another. It is carried out by heating a rosin at 100° to 300° in the presence of a disproportionation catalyst. Examples of disproportionation catalyst are supported or non supported metals such as palladium, nickel and platinum iodine, iodides such as iron iodide, $SO_2$ and sulphides such as iron sulphide. The catalyst is employed in the amount of 0.1% to 5% by weight on the basis of the amount of a rosin employed. The disproportionated rosin prepared in the above manner has preferably a content of abietic acid of not more then 5% by weight.

In the first step to obtain the surfactant, according to the invention, the rosin is esterified with an alcohol. The esterification of the rosin can be carried out by usual methods for instance, it is carried out by heating rosin with a mono or polyhydric alcohol in a closed or open reaction vessel in the presence or absence of an esterifying catalyst and in the presence of or absence of a solvent at 180° C. to 300° C., preferably 200° C. to 290° C. for 1 hour to 20 hours, preferably 5 to 15 hours.

Examples of esterifying catalysts employed if desired are acidic catalysts such as sulphuric acid, acetic acid, hypophosphorous acid and p-toluene sulphonic acid, alkaline earth metal hydroxides such as calcium hydroxide, metal oxides such as magnesium oxide and calcium oxide, carbonates such as calcium carbonate and acetates such as magnesium acetate and calcium acetate.

As alcohols mono or polyhydric alcohols can be used. Use is suitably made of polyhydric alcohols and preferably of straight or branched chain non aromatic polyhydric alcohols containing 2 to 18 carbon atoms. Suitable alcohols are glycols such as triethylene glycol, diethylene glycol, polyethylene glycol, glycerol, trimethylolethane, trimethylolpropane, pentaerythritol, diglycerol, dipentaerythritol, mannitol, sorbitol, hexitol, decanol and methanol. Triethylene glycol, glycerol and pentaerythritol are preferred. The alcohols may be employed alone or in combination.

The alcohol is preferably employed in such an amount that the ratio of the hydroxyl equivalents of the alcohol to the carboxyl equivalents of the rosin is in the range from 1.0:1.0 to 1.5:1.0.

The rosin ester obtained by esterifying the rosin in the manner described above has a softening point of −30° C. to 140° C. and has an acid value of not more than 30 mg KOH/g and preferably not more than 25 mg KOH/g.

In the next step the esterified rosin is grafted with an unsaturated carboxylic acid or anhydride. Preferably the carboxylic acid is an α–β ethylenically unsaturated acid which is grafted onto the rosin by reaction with the unsaturation in the rosin acids. A common reaction between the unsaturated acid and the rosin acid is the fortification reaction. In this reaction a Diels-Alder adduct is formed from a conjugated double bond of the rosin acid and the α-β unsaturated carboxylic acid or anhydride. As suitable acids can be mentioned fumaric acid and its half esters, maleic acid (and anhydride) and its half esters, acrylic acid, methacrylic acid and related acryl and aryl acids, itaconic acid (and anhydride), and oligomers and copolymers of acrylics and vinyls with ethylenically unsaturated acids styrene/ acrylic acids copolymer, etc). The fumaric acid and maleic acid (and anhydride) are the preferred ones.

The unsaturated carboxylic acid is reacted in the mole ratio of 0.05:1–1.5:1, preferably 0.2:1–0.8:1 with each rosin associated with a rosin ester, i.e. a pentaerythritol rosin ester has a maximum of 4 rosins associated with it, whilst a glycerol ester has a maximum of 3. The final acid value should at least be greater than 30. The reaction temperature is from about 170 to about 220° C.

Then in the final step the grafted/fortified rosin ester is further esterified with a polyethylene glycol with a Mw of 1000–20000. The Mw of the polyethylene glycol is preferably 4000–16 000, more preferably 5000–12000, and most preferably 8000–12000. Polyethylene glycol is suitably reacted in the mole ratio of 0.2:1–1:1 with each free carboxylic group, so that the final acid value is less than 30 and preferably less than 25, and most preferably less than 5. The reaction is suitably undertaken at a temperature of between 180° C. to 300° C. preferably at 240° to 290° C. for 1 hour to 20 hours, preferably 5 to 15 hours in the presence of a catalyst. As suitable catalysts can be mentioned acidic catalysts such as sulphuric acid, acetic acid, hypophosphorous acid and p-toluene sulphonic acid, alkaline earth metal hydroxides such as calcium hydroxide, metal oxides such as magnesium oxide and calcium oxide, carbonates such as calcium carbonate and acetates such as magnesium acetate and calcium acetate.

Alternatively the reaction between the carboxylic groups of the unsaturated acid/anhydride and the polyethylene glycol is carried out first and the grafting of the esterified rosin is carried out with the polyethylene glycol ester of the unsaturated acid/anhydride. This manner of production gives a lower yield than the first reaction mode but it is a possible way of production.

The surfactants according to the invention are preferably used as dispersing agents to prepare tackifier dispersions, though other surfactant applications are possible. Preferably the tackifier dispersion is a dispersed rosin. The tackifier rosin can be an unmodified or a modified rosin. There are a lot of different ways of modifying rosin. The rosin can be partially fortified or esterified, preferably the rosin is a glycerol, pentaerythritol or triethylene glycol ester. The rosin can be treated with paraformaldehyde in the presence of paratoluene sulphonic acid to inhibit crystallization or it can be stabilized by disproportionation. Rosins partially saponified with sodium or potassium hydroxide or with a volatile base (ammonia or a lower amine such as triethanolamine) is also useful. The different kinds of rosin can be used as such or in mixtures of two or more. It is also possible to incorporate a $C_5$ to $C_9$ hydrocarbon resin.

When preparing the tackifier dispersion the rosin is first melted and the surfactant according to the invention is added as a concentrate or in an aqueous solution. The surfactant is suitably added in an amount of 2–15% by weight based on the weight of tackifier resin, preferably 5–8%. Sufficient hot water (e.g. 20 to 40% based on the weight of tackifier resin) is stirred in to form a creamy water in oil emulsion. On dilution with water the emulsion inverts to provide a stable oil in water emulsion, typically having a solids content of 20% to the maximum achievable oil in water concentration, preferably 50–60% by weight solids.

The preferred physical properties of a tackifier dispersion are that the total solids content is greater than 50%, the mean particle size is less than 2.0 microns and maximum viscosity is 1000 cps (Brookfield 3/50 rpm). It is preferred that the tackifier dispersion has a stable shelf life of six months and will demonstrate no separation, coagulation or deposition. It is also preferrad that the dispersion is low foaming and have good mechanical stability during pumping, transportation and mixing, as well as low foaming and good stability when formulated and during coating. The surfactant should allow the release of water after coating when passed through the drying ovens. By using the surfactant according to the invention it is possible to prepare a tackifier dispersion which exhibits the desired physical properties.

If required, small quantities of anionic surfactants, preferably less than 1%, can be incorporated into the dispersion. However, tackifier dispersions manufactured solely with these anionic surfactants have a negative effect upon the cohesive strength of a formulated pressure sensitive adhesive. Typical anionic surfactants include alkyl aryl sulphonates, such as sodium or calcium alkyl benzene sulphonates, fatty alcohol sulphates, eg sodium lauryl sulphate, phosphate esters, eg the sodium salts of mono- and di-esters of orthophosphoric acid, esters of sulphosuccinic acid, the sodium salts of sulphated monoglycerides and sulphonates or sulphosuccinates of alkyl phenol polyoxyalkylene oxide condensates or of polyoxyalkylene oxide condensates, eg the ammonium salt of nonylphenol polyethylene oxide sulphonic acid.

A pressure sensitive adhesive is prepared by blending the tackifier dispersion with a latex or combination of latices using conventional blenders to provide a homogenous mixture in an amount of 20 to 150 parts by weight per 100 parts of dry polymer in the latex, preferably 20 to 100 parts by weight per 100 parts of dry polymer.

A variety of polymer latices can be used preferably derived from natural or synthetic rubbers or elastomers such as styrene-butadiene copolymers, natural rubbers. polychloroprene, acrylonitrile-butadiene or alternatively latices derived from various acrylic or vinyl latices such as ethyl hexyl acrylate, butyl acrylate, methyl methacrylate, ethyl acrylate copolymers, ethylene vinyl acetates etc.

The prepared adhesive can be coated on a suitable carrier and dried. As suitable carriers can be mentioned, in the case of tapes and labels, a non woven material eg. paper, a woven material eg. cotton; a homopolymer of an unsaturated monomer such as ethylene, propylene or vinyl chloride or the carrier can be of polyester or polyamide.

The adhesive composition is applied to the carrier by conventional coating techniques such as roller coaters, blade coaters, meyer rods or air coaters and dried by passing through a heating tunnel or oven. The adhesive coat is either applied directly or by transfer coating.

The dry coat weight is suitably from 15 to 70 gsm. For packaging tapes and label applications the dry coat weight is generally from 15 to 30 gsm and for masking tapes about 30 to 60 gsm.

The invention is now illustrated by means of the following examples, where parts and percentages mean parts by weight and percentages by weight unless otherwise specified.

EXAMPLE 1

100 g rosin was heated under a nitrogen blanket at 280° C. with constant agitation in combination with 15 g glycerol in the presence of 0.23 g zinc oxide catalyst for 8 hours to obtain a product of acid value 10mg KOH/g, ring and ball 88° C.

95 g of the glycerol ester from above was cooled to 180° C. and reacted with 9.5 g maleic anhydride for 4 hours until the water soluble acid value was less than 5 mg KOH/g, to obtain a product of acid value 63.0 mg KOH/g, ring and ball 134° C. This product was further reacted with 950 g polyethylene glycol with a Mw of 8000 at 280° C. in the presence of 2 g paratoluene sulphonic acid for 14 hours. The final acid value was 2.5 mg KOH/g, ring and ball 55.0° C.

400 g of a pentaerythritol ester of rosin, (AV=18 mg KOH/g ring and ball=85.0° C.), was warmed in a pot to 110° C. When molten with stirring 2.4 g of a 50% solution of KOH was added followed by 24.0 g of the above produced surfactant. 70 ml hot water was added to obtain the inversion followed by 260 ml hot dilution water to obtain a stable dispersion of mean particle size 1.5 microns. The viscosity was 280 cps (Brookfield 3/50rpm) and solids content 55.4%, dried film ring and ball 83.4° C.

This rosin dispersion has a minimum 6 months shelf storage stability, low foaming characteristic and good shear stability.

60 parts and 80 parts (by dry weight) of the tackifier dispersion, prepared above (Tackifier A) were blended separately to each of 100 parts (by dry weight) of butyl acrylate polymer (Acronal™ 3433) using a laboratory shear blender. The adhesive was coated to silicone release liner using a meyer bar and then dried at 90° C. for 10 minutes in a fan assisted oven to obtain a target coat weight of 20 gsm, before laminating to 80 gsm face paper. The laminate was conditioned at 50 relative humidity at 23° C. before assessing the adhesive properties. The following tests were applied to 25 mm strips of the coated samples:

Shear: 1860 g weight applied to 25 mm sq. sample bonded to a vertical glass surface.

Glasspeel: 180° peel after 20 minutes adhesion to glass after being applied by rolling a 2 kg roller the length of the sample in both direction twice. FINAT Test Method 1.

Polypeel: 180° peel after 20 minutes adhesion to untreated polyethylene sheet after being applied as in 2.

Looptack: Instantaneous tack to stainless steel. FINAT Test Method 9.

Polytack: Instantaneous looptack to untreated polyethylene sheet.

The test result is given below. Tackifier A is the tackifier dispersion according to the invention. Tackifier B is a tackifier dispersion with the same pentaerythritol ester of rosin as in the example above but with a conventional surfactant. The surfactant was an alkyl phosphate. To both tackifier dispersions 0.3 parts potassium hydroxide was added as a co stabilizer.

| % Tackifier parts (dry) | 100 parts dry Acronal™ DS 3433 | | | | |
|---|---|---|---|---|---|
| | Shear (Hr) | Glasspeel (N) | Polypeel (N) | Looptack (N) | Polytack (N) |
| — | 11.8 | 10.4 | 2.7 | 10.0 | 4.4 |
| 80 Tackifier A | 12.8 | PT | 8.1 | 22.1 | 5.7 ss |
| 60 Tackifier A | 8.4 | PT | 8.2 | 21.1 | 11.2 |
| 80 Tackifier B | 6.3 | PT | 1.9–4.1 ss | 17.8 | 3.2 ss |
| 60 Tackifier B | 6.9 | PT | 8.5 | 19.1 | 10.6 |

(PT means Paper Tear and ss means Slip-stick Mode of Failure).

EXAMPLE 2

Example 1 was repeated with 2-Ethyl hexyl acrylate (Acronal™ V205) as the polymer instead of butylacrylate. The results were as follows:

| % Tackifier parts (dry) | 100 parts dry Acronal™ V 205 | | | | |
|---|---|---|---|---|---|
| | Shear (Hr) | Glasspeel (N) | Polypeel (N) | Looptack (N) | Polytack (N) |
| — | 10.4 | PT | 5.5 | 9.8 | 6.6 |
| 40% Tackifier A | 3.8 | PT | 1.5–3.2 ss | PT | 2.6 ss |
| 30% Tackifier A | 3.0 | PT | 9.3 | 23.8 | 6.2 ss |
| 40% Tackifier B | 2.0 | PT | 1.5–7.7 ss | 21.2 | 3.2 ss |
| 30% Tackifier B | 1.8 | PT | 1.6–7.7 ss | 23.0 | 6.0 ss |

(PT means Paper Tear and ss means Slip-stick Mode of Failure).

EXAMPLE 3

100 g rosin was heated under a nitrogen blanket at 275° C. with constant agitation in combination with 24.1 g triethylene glycol (TEG) in the presence of 0.2 g hypophosphorous acid catalyst for 11 hours to obtain a product of acid value 24 mg KOH/g, liquid at 23° C.

45 g of the TEG ester from above was cooled to 180° C. and reacted with 4.5 g maleic anhydride for 4 hours until the water soluble acid value was less than 5 mg KOH/g, to obtain a product of acid value 41.6 mg KOH/g, ring and ball 66.2° C. This product was further reacted with 500 g polyethylene glycol with a Mw of 10000 at 275° C. in the presence of 1.1 g hypophosphorous acid for 16 hours. The final acid value was 2.5 mg KOH/g, ring and ball 63.0° C.

400 g of a glycerol ester of rosin, (AV=13 mg KOH/g ring and ball=86.0° C.), was warmed in a pot to 110° C. When molten with stirring 2.4 g of a 50% solution of KOH was added followed by 24.0 g of the above produced surfactant. 70 ml hot water was added to obtain the inversion followed by 260 ml hot dilution water to obtain a stable dispersion of mean particle size 1.5 microns. The viscosity was 560 cps (Brookfield 3/50rpm) and solids content 60.0%, dried film ring and ball 80.8° C. This is tackifier C.

Adhesive performance (coating and testing as described in Example 1).

| Tackifier C parts (dry) | 70 parts dry Acronal™ V 205 | | | | |
|---|---|---|---|---|---|
| | Shear (Hr) | Glasspeel (N) | Polypeel (N) | Looptack (N) | Polytack (N) |
| 30 | 2.8 | PT | 1.7–6.9 ss | 22.1 | 5.3 ss |

(PT means Paper Tear and ss means Slip-stick Mode of Failure).

We claim:

1. A method for the production of a surfactant which comprises
   (1) esterifying a rosin with an alcohol to an acid value of less than 30, wherein the alcohol is a polyhydric alcohol containing 2 to 18 carbon atoms, in order to obtain a rosin ester;
   (2a) grafting the rosin ester with an unsaturated carboxylic acid or anhydride, wherein the mole ratio carboxylic acid or anhydride/rosin is from about 0.05:1–5:1, to obtain a grafted rosin ester;
   (3a) esterifying the grafted rosin ester with a polyethylene glycol to an acid value of less than 30, wherein said polyethylene glycol has a Mw of 4000–16000, and wherein the mole ratio glycol/free carboxylic acid group is from 0.2:1–1:1; or, as an alternative to steps (2a) and (3a), (2b) esterifying an unsaturated carboxylic acid or anhydride with a polyethylene glycol to an acid value of less than 30, wherein said polyethylene glycol has a Mw of 4000–16000 and wherein the mole ratio glycol/free carboxylic acid group or anhydride is from 0.2:1–1:1;
   (3b) and grafting the rosin ester from step (1) with the ester from step (2b), wherein the mole ratio of ester from (2b)/rosin ester is from about 0.05:1–1.5:1.

2. The method of claim 1 wherein the alcohol of step (1) is a straight or branched chain non-aromatic polyhydric alcohol containing 2 to 18 carbon atoms.

3. The method of claim 1 wherein the alcohol of step (1) is selected from triethylene glycol, glycerol, pentaerythritol or mixtures thereof.

4. The method of claim 1 wherein the unsaturated carboxylic acid or anhydride is maleic acid, maleic anhydride or fumaric acid.

5. The method of claim 1 wherein the polyethylene glycol has a Mw of 8000–12000.

6. The method of claim 1 wherein the reaction in (3a) or (2b) is conducted in the presence of an esterification catalyst.

7. A surfactant prepared by a method which comprises
   (1) esterifying a rosin with an alcohol to an acid value of less than 30, wherein the alcohol is a polyhydric alcohol containing 2 to 18 carbon atoms, in order to obtain a rosin ester;
   (2a) grafting the rosin ester with an unsaturated carboxylic acid or anhydride, wherein the mole ratio carboxylic acid or anhydride/rosin is from about 0.05:1–1.5:1, to obtain a grafted rosin ester;
   (3a) esterifying the grafted rosin ester with a polyethylene glycol to an acid value of less than 30, wherein said polyethylene glycol has a Mw of 4000–16000 and wherein the mole ratio glycol/free carboxylic acid group is from 0.2:1–1:1; or, as an alternative to steps (2a) and (3a), (2b) esterifying an unsaturated carboxylic acid or anhydride with a polyethylene glycol to an acid value of less than 30, wherein said polyethylene glycol has a Mw of 4000–16000 and wherein the mole ratio glycol/free carboxylic acid group or anhydride is from 0.2:1–1:1;
   (3b) and grafting the rosin ester from step (1) with the ester from step (2b), wherein the mole ratio of ester from (2b)/rosin ester is from about 0.05:1–1.5:1.

8. The surfactant of claim 7 wherein the alcohol in (1) is a straight or branched chain non-aromatic polyhydric alcohol containing 2 to 18 carbon atoms.

9. The surfactant of claim 7 wherein the alcohol of step (1) is selected from triethylene glycol, glycerol, pentaerythritol or mixtures thereof.

10. The surfactant of claim 7 wherein the unsaturated carboxylic acid or anhydride is maleic acid, maleic anhydride or fumaric acid.

11. The surfactant of claim 7 wherein the polyethylene glycol has a Mw of 8000–12000.

12. A tackifier composition which comprises, as a dispersing agent, a surfactant according to claim 7.

13. An aqueous tackifier dispersion which comprises a tackifier resin based on rosin, rosin derivative and/or hydrocarbons and 2–15 weight %, based on the amount of tackifier of a surfactant according to claim 7.

14. A pressure sensitive adhesive which comprises the tackifier dispersion of claim 13.

* * * * *

UNITED STATES PATENT AND TRADEMARK OFFICE
CERTIFICATE OF CORRECTION

PATENT NO.  : 5,552,519
DATED       : September 3, 1996
INVENTOR(S) : Paul N. Hemmings, Long Wang It is certified that error appears in the above—identified patent and that said Letters Patent is hereby corrected as shown below:

Column 7,
In Claim 1, line 10(2a), please change "0.05:1 - 5:1" to --0.05:1 - 1.5:1--.

Signed and Sealed this

Nineteenth Day of November, 1996

Attest:

BRUCE LEHMAN

Attesting Officer         Commissioner of Patents and Trademarks